United States Patent
Bi et al.

(10) Patent No.: US 12,254,906 B1
(45) Date of Patent: Mar. 18, 2025

(54) PLANARIZATION STRATEGY IN NANO-SIZED FABRICATION

(71) Applicant: Seagate Technology LLC, Fremont, CA (US)

(72) Inventors: Cheng Bi, Shakopee, MN (US); Zhiguo Ge, Edina, MN (US); Shaun E McKinlay, Eden Prairie, MN (US); Minzhen Cai, Eden Prairie, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 357 days.

(21) Appl. No.: 17/808,680

(22) Filed: Jun. 24, 2022

(51) Int. Cl.
G11B 5/31 (2006.01)
B24B 37/04 (2012.01)

(52) U.S. Cl.
CPC ............ *G11B 5/313* (2013.01); *B24B 37/042* (2013.01)

(58) Field of Classification Search
CPC ....... G11B 5/313; B24B 7/228; B24B 37/005; B24B 37/04; B24B 37/042; B24B 37/048; H01L 21/304; H01L 21/30625; H01L 21/3212; H01L 21/31053
See application file for complete search history.

(56) References Cited

U.S. PATENT DOCUMENTS

| | | | |
|---|---|---|---|
| 5,920,792 A * | 7/1999 | Lin | H01L 21/022 438/692 |
| 6,596,639 B1 | 7/2003 | Easter et al. | |
| 7,009,811 B2 | 3/2006 | Schmidt | |
| 7,223,693 B2 | 5/2007 | Choi et al. | |
| 7,335,960 B2 | 2/2008 | Han et al. | |
| 9,082,426 B1 * | 7/2015 | Chen | G11B 5/3169 |
| 9,466,501 B2 | 10/2016 | Lu et al. | |
| 10,297,279 B1 | 5/2019 | Ge et al. | |
| 10,804,151 B2 | 10/2020 | Uzoh et al. | |
| 2004/0142554 A1 * | 7/2004 | Lui | H01L 21/76808 438/631 |
| 2012/0220128 A1 * | 8/2012 | Shao | H01L 21/823456 438/692 |
| 2013/0061876 A1 * | 3/2013 | Suen | H01L 21/7684 134/6 |
| 2018/0198045 A1 * | 7/2018 | Perzlmaier | H01L 33/38 |

FOREIGN PATENT DOCUMENTS

EP 1801858 A1 6/2007

\* cited by examiner

Primary Examiner — Joel D Crandall

(57) ABSTRACT

A method of planarizing a device having a surface topography with at least one material at a surface of the device is described. The method comprises the steps of depositing a stop layer over at least a portion of the at least one material which substantially retains the surface topography of the device. A sacrificial layer is deposited over at least a portion of the stop layer. A planarization process is performed on the device. The planarization process includes the steps of performing a chemical mechanical polish (CMP) on the top surface of the sacrificial layer. A physical removal step is conducted on the remainder portion of the sacrificial layer to form a planarized surface. A second CMP step and a second physical removal step are conducted, to form a planarized device.

20 Claims, 9 Drawing Sheets

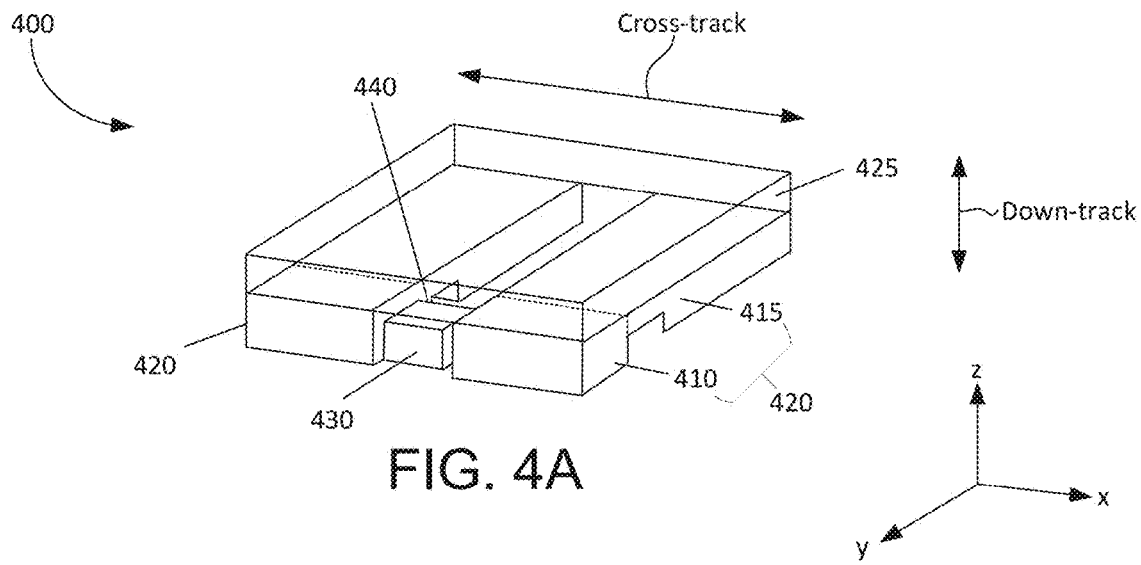
FIG. 4A
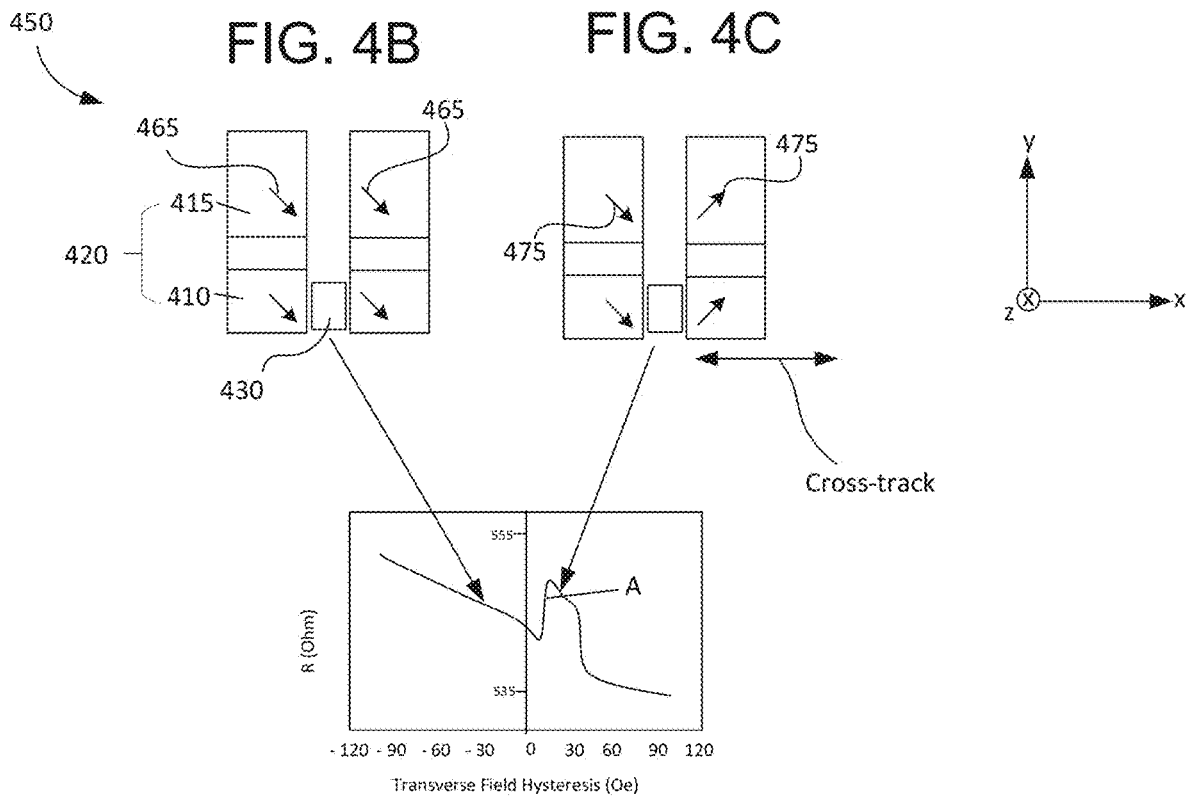
FIG. 4B FIG. 4C
FIG. 4D

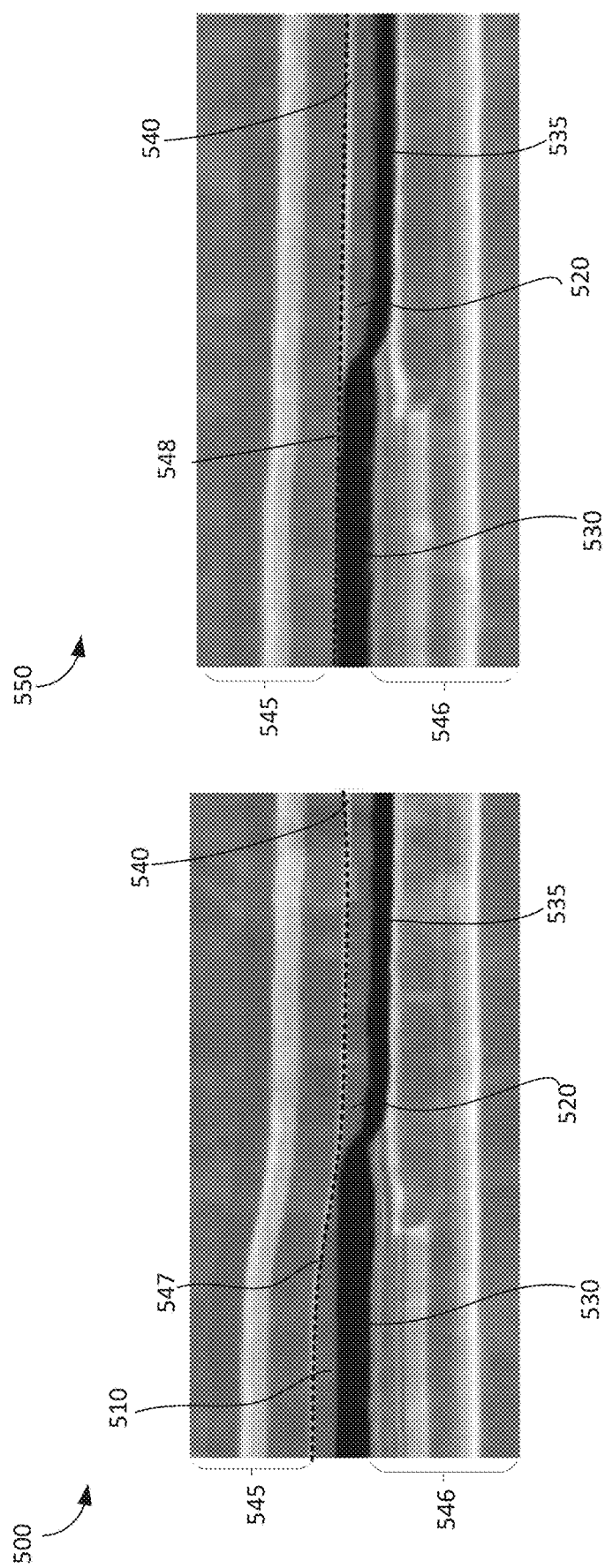

PLANARIZATION STRATEGY IN NANO-SIZED FABRICATION

BACKGROUND

Data storage devices commonly have a recording head that includes a read transducer that reads information from a data storage medium and a write transducer that writes information to a data storage medium. In magnetic data storage devices such as hard disc drives, a magnetoresistive (MR) sensor, such as a tunneling giant magnetoresistive (TGMR) sensor may be employed as the read transducer to read a magnetic signal from the magnetic media. The MR sensor has an electrical resistance that changes in response to an external magnetic field. This change in electrical resistance may be detected by processing circuitry in order to read magnetic data from the adjacent magnetic media.

In the process of manufacturing a read transducer, surface topography effects can occur. For example, surface topography can form as a result of shadow effects from photoresist or from a hard mask during a mill process. In other examples, surface topography can form as a result of differences in mill rates for two or more materials. In some examples of read transducer manufacture, the reader definition process includes formation of a reader junction between multiple layers of reader stack material and a backfilled material. In other examples of read transducer manufacture, milling of a reader junction includes milling into two materials with different mill rates. In some cases, surface topography at the reader junction can be created during the reader junction milling process. This topography may then propagate to a further layer or structure that is deposited over the milled structure. This topography can subsequently affect the performance of the manufactured device.

In order to reduce any created topography, such as at the junction of the reader stack and the backfilled material, a planarization process can be used. Some planarization processes (e.g., chemical-mechanical polishing) utilize a slurry that comprises abrasive particles within wet chemicals. The wet chemical, however, can cause unwanted corrosion at the reader junction.

SUMMARY

The present disclosure relates to methods of planarizing materials, such as those where surface topographies are created as part of a thin film device fabrication process. The present invention finds particular application, for example, in the manufacture of nano-sized devices where topographical features can be effectively planarized without adversely creating other surface topographies and/or causing deleterious effects at material junctions.

In one example, a method of planarizing a device having a surface topography with at least one material at a surface of the device is described. The method comprises the steps of depositing a stop layer over at least a portion of the at least one material. The stop layer substantially retains the surface topography of the device. A sacrificial layer is deposited over at least a portion of the stop layer and the sacrificial layer substantially retains the surface topography of the device. A planarization process is performed on the device. The planarization process includes performing chemical mechanical polish (CMP) on the top surface of the sacrificial layer, leaving a remainder portion of the sacrificial layer. A physical removal step is conducted on the remainder portion of the sacrificial layer which removes at least a portion of the stop layer and exposes the top surface of the at least one material to form a planarized surface. A second CMP step is conducted on the planarized surface which removes the remainder portion of the sacrificial layer and also removes a portion of the at least one material. A second physical removal step is performed on the remainder portion of the stop layer and the remainder portion of the at least one material, to form a planarized device.

In another example, a method of planarizing a device having a surface topography with at least one material at a surface of the device is described. The method comprises the steps of depositing a stop layer over at least a portion of the at least one material. The stop layer substantially retains the surface topography of the device. A sacrificial layer is deposited over at least a portion of the stop layer and the sacrificial layer substantially retains the surface topography of the device. A planarization process is performed on the device where the planarization process includes at least one polish step and at least one physical removal step.

These and other features and aspects of various examples may be understood in view of the following detailed discussion and accompanying drawings.

BRIEF DESCRIPTION OF THE DRAWINGS

FIG. 4A is a schematic representation of a portion of a read head, according to various aspects of the present disclosure. FIGS. 4B and 4C illustrate modeling of a read head, according to various aspects of the present disclosure. FIG. 4D illustrates a transfer curve of the resistance response of a free layer to applied magnetic field, according to various aspects of the present disclosure.

FIGS. 5A and 5B illustrate microstructural device portions of a read head, according to various aspects of the present disclosure.

DETAILED DESCRIPTION

Figure 1:
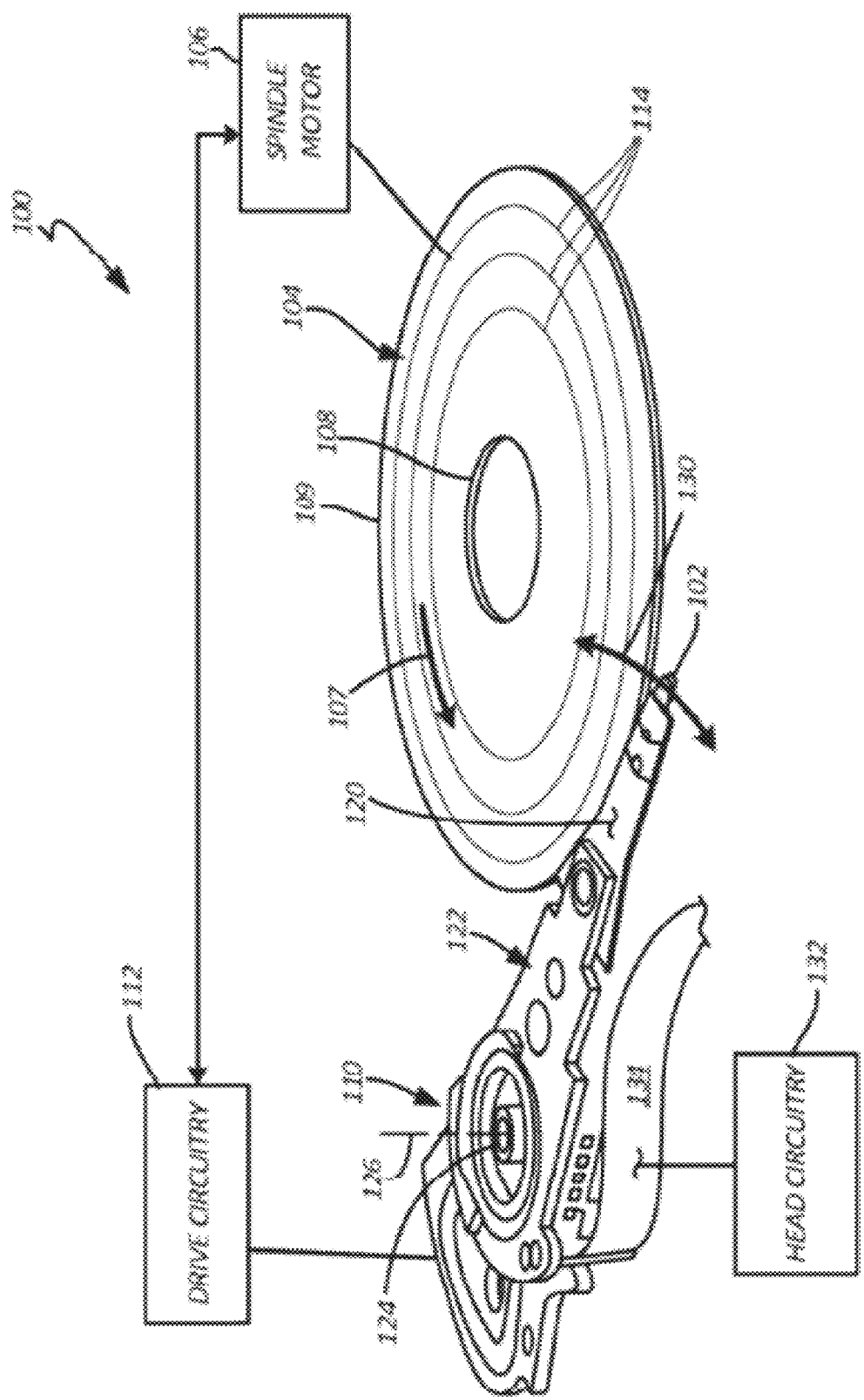
FIG. 1 shows an illustrative operating environment, according to various aspects of the present disclosure.

FIG. 1 shows an illustrative operating environment in which certain specific examples disclosed herein may be incorporated. Examples of the present disclosure are not limited to any particular operating environment such as the operating environment shown in FIG. 1.

FIG. 1 is a schematic illustration of a data storage device 100 including a data storage medium and a recording head for reading data from and/or writing data to the data storage medium. In data storage device 100, recording head 102 is positioned above data storage medium 104 to read data from and/or write data to the data storage medium 104. In the example shown, the data storage medium 104 is a rotatable disc or other magnetic storage medium that includes a magnetic storage layer or layers. For read and write operations, a spindle motor 106 (illustrated schematically) rotates the data storage medium 104 as illustrated by arrow 107 and an actuator mechanism 110 positions the recording head 102 relative to data tracks 114 on the rotating data storage medium 104 between an inner diameter 108 and an outer diameter 109. Both the spindle motor 106 and actuator mechanism 110 are connected to and operated through drive circuitry 112 (schematically shown). Recording head 102 is coupled to the actuator mechanism 110 through a suspension assembly which includes a load beam 120 connected to an actuator arm 122 of the actuator mechanism 110 for example through a swage connection. Although FIG. 1 illustrates a single load beam coupled to the actuator mechanism 110, additional load beams 120 and recording heads 102 can be coupled to the actuator mechanism 110 to read data from or write data to multiple discs of a disc stack. The actuator mechanism 110 is rotationally coupled to a frame or deck (not shown) through a bearing 124 to rotate about axis 126. Rotation of the actuator mechanism 110 moves recording head 102 in a cross-track direction as illustrated by arrow 130.

Recording head 102 includes one or more transducer elements (not shown in FIG. 1) coupled to head circuitry 132 through flex circuit 134.

Figure 2:
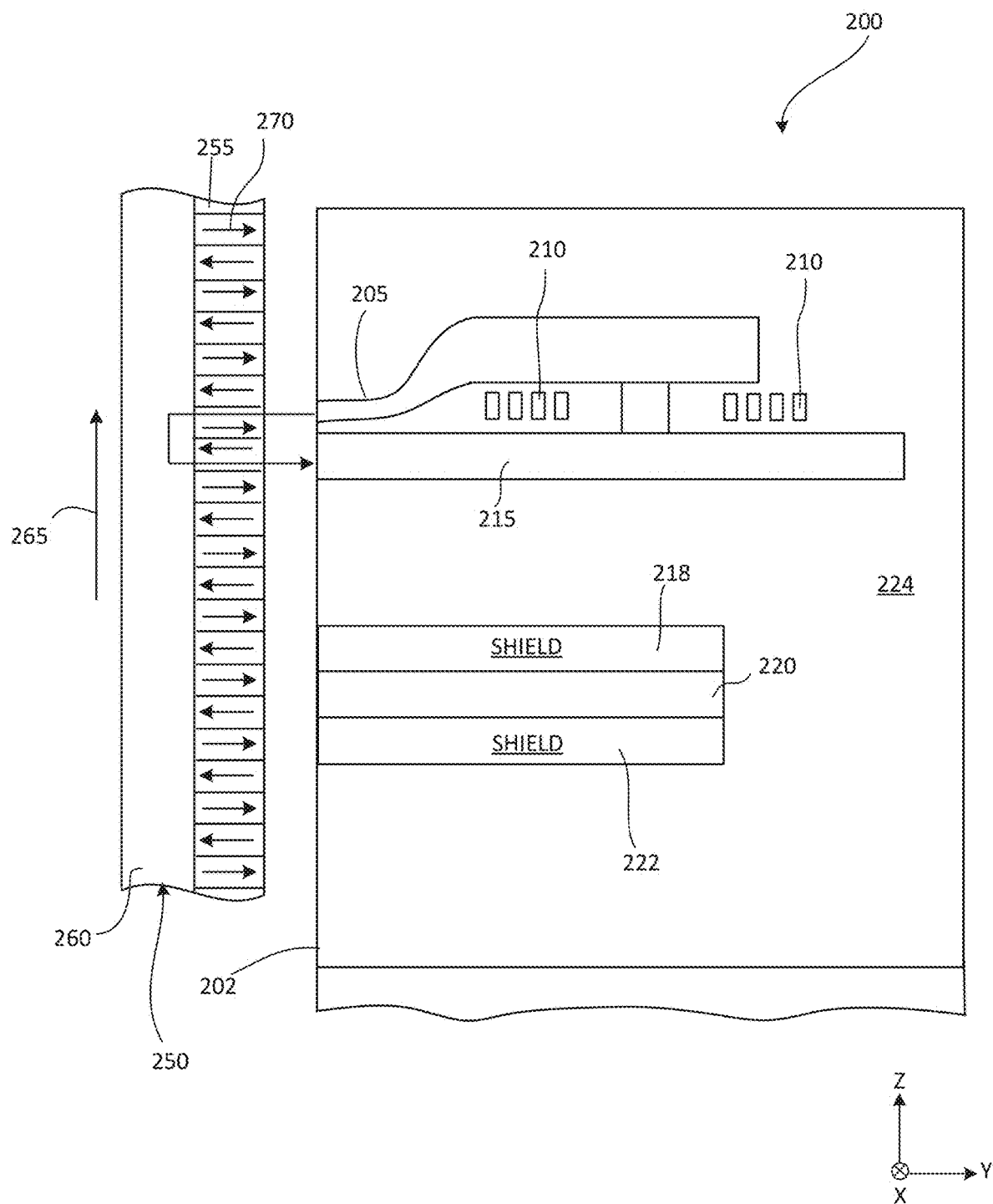
FIG. 2 is a schematic diagram of a cross-section of one embodiment of a recording head that reads from and writes to a storage medium.

FIG. 2 is a schematic diagram showing a cross-sectional view of portions of a recording head 200 and a data storage medium 250 taken along a plane substantially normal to a plane of a bearing surface (for example, an air bearing surface (ABS)) 202 of recording head 200. The head elements shown in FIG. 2 are illustratively included in a recording head such as recording head 102 in FIG. 1. Medium 250 is a data storage medium such as data storage medium 104 in FIG. 1. Those skilled in the art will recognize that heads and recording media commonly include other components. Examples of the present disclosure are not limited to any particular recording heads or media.

Recording head 200 includes a write pole 205, a magnetization coil 210, a return pole 215, a top shield 218, a read transducer 220, a bottom shield 222 and a wafer overcoat 224. Storage medium 250 includes a recording layer 255 and an underlayer 260. Storage medium 250 rotates in the direction shown by arrow 265. Arrow 265 is illustratively a direction of rotation such as arrow 107 in FIG. 1.

In one example, electric current is passed through magnetization coil 210 to generate a magnetic field. The magnetic field passes from write pole 205, through recording layer 255, into underlayer 260, and across to return pole 215. The magnetic field illustratively records a magnetization pattern 270 in recording layer 255. Read transducer 220 senses or detects magnetization patterns in recording layer 255 and is used in retrieving information previously recorded to recording layer 255.

Figure 3:
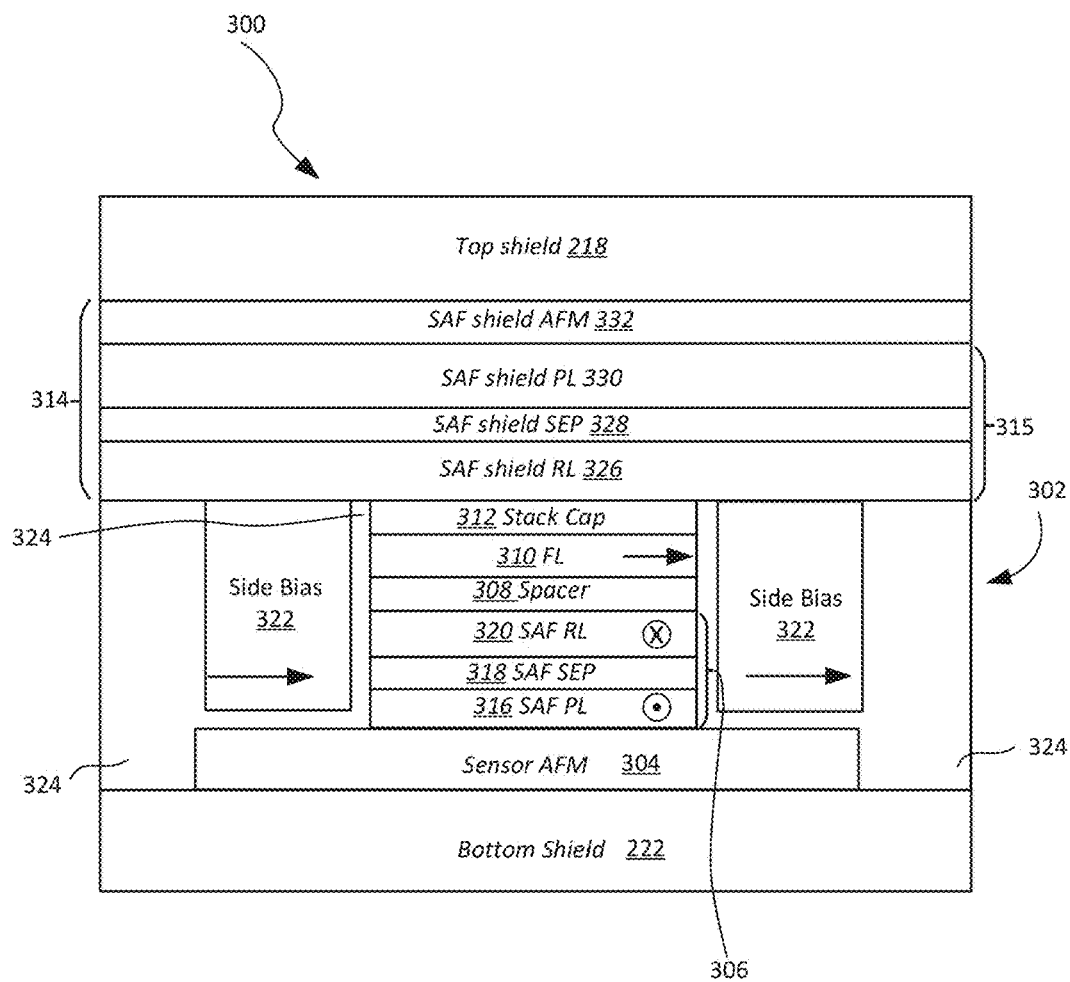
FIG. 3 is a schematic air-bearing surface view of a magnetic reproducing device having a single read sensor.

Different layers of an example of an individual sensor are shown in FIG. 3. FIG. 3 is a schematic block diagram illustrating an example read head 300 including a single magnetoresistive sensor 302. In some examples, a read head may comprise multiple magnetoresistive sensors. Magnetoresistive sensor 302 is positioned between top shield 218 and bottom shield 222. Top and bottom shields 218 and 222, which may be made of a material having high magnetic permeability, reduce or substantially block extraneous magnetic fields, such as, for example, those from adjacent bits on data discs from impacting magnetoresistive sensor 302, thus improving the performance of magnetoresistive sensor 302. In one implementation, top shield 218 and bottom shield 222 permit magnetic fields from the bit directly under magnetoresistive sensor 302 to affect magnetoresistive sensor 302, and thus be read.

Magnetoresistive sensor 302 includes a plurality of layers including sensor antiferromagnetic (AFM) layer 304, sensor stack synthetic antiferromagnetic (SAF) structure 306, spacer layer 308, free layer or sensing layer 310, stack cap 312 and SAF shielding structure 314.

In the embodiment shown in FIG. 3, sensor stack SAF structure 306 includes pinned layer 316, thin separation layer 318, which may comprise a metal such as ruthenium (Ru), and reference layer 320. The magnetic moments of each of pinned layer 316 and reference layer 320 are not allowed to rotate under magnetic fields in the range of interest (for example, magnetic fields generated by the bits of data stored on the data discs). The magnetic moments of reference layer 320 and pinned layer 316 are generally oriented normal to the plane (e.g., in the y direction) of FIG. 3 and anti-parallel to each other.

In one example, free layer 310 is not exchange coupled to, for example, an antiferromagnet. As a result, the magnetic moment of free layer 310 is free to rotate under the influence of an applied magnetic field in a range of interest. Read head 300 further includes side biasing magnets or side shields 322, which produce a magnetic field that biases free layer 310 with a magnetic moment parallel to the plane of the figure and generally oriented horizontally. This bias prevents the magnetic moment of free layer 310 from drifting due to, for example, thermal energy, which may introduce noise into the data sensed by read head 300. The bias is sufficiently small, however, that the magnetic moment of free layer 310 can change in response to an applied magnetic field, such as a magnetic field of a data bit stored on the data discs. In some examples, the side biasing magnets or side shields 322 are formed of soft magnetic material (i.e., material that can be easily magnetized and demagnetized at relatively low magnetic fields). The soft magnetic material may be an alloy comprising Ni and Fe. Magnetoresistive sensor 302 is separated and electrically isolated from side shields 322 by an isolation layer 324 including, for example, insulating materials. Isolation layer 324 may also be present in other regions of read head 300 as shown in FIG. 3.

In the example shown in FIG. 3, SAF shielding structure 314 includes SAF shield reference layer 326, thin SAF shield separation layer 328, which may comprise a metal such as Ru in some embodiments, SAF shield pinned layer 330 and SAF shield AFM layer 332. Because magnetoresistive sensor 302 utilizes soft side shields 322, SAF shield reference layer 326 should have a relatively fixed magnetization to assist in stabilizing the magnetizations of side shields 322. Thus, AFM layer 332 needs to pin the magnetization of SAF shield pinned layer 330 substantially parallel to the bearing surface, which results in the relatively fixed magnetization of SAF shield reference layer 326 due to antiferromagnetic coupling across SAF shield separation layer 328 and thus in stabilizing the magnetizations of the side shields 322 substantially parallel to the bearing surface as well. SAF shield reference layer 326 and SAF shield pinned layer 330 may be formed of a soft magnetic material (for example, an alloy comprising Ni and Fe). It should be noted that, in some examples, there may be non-magnetic metal inserts (not shown) between SAF shield AFM 332 and top shield 218, and between sensor AFM 304 and bottom shield 222.

In some examples, magnetoresistive sensor 302 may utilize tunneling magnetoresistance (TMR) or giant magnetoresistance (GMR) effects. In embodiments that utilize TMR effects, spacer layer 308 is a tunneling barrier layer that separates the SAF structure 306 from the free layer 310. Tunneling barrier layer 308 is sufficiently thin that quantum mechanical electron tunneling occurs between reference layer 320 in SAF structure 306 and free layer 310. The electron tunneling is electron-spin dependent, making the magnetic response of magnetoresistive sensor 302 a function of the relative orientations and spin polarizations of SAF structure 306 and free layer 310. The highest probability of electron tunneling occurs when the magnetic moments of SAF structure 306 and free layer 310 are parallel. The lowest probability of electron tunneling occurs when the magnetic moments of SAF structure 306 and free layer 310 are antiparallel. Accordingly, the electrical resistance of magnetoresistive sensor 302 changes in response to an applied magnetic field. The data bits on the data discs in the disc drive may be magnetized in a direction normal to the plane of FIG. 3, either into the plane of the figure, or out of the plane of the figure. Thus, when magnetoresistive sensor 302 passes over a data bit, the magnetic moment of free layer 310 is rotated either into the plane of FIG. 3 or out of the plane of FIG. 3, changing the electrical resistance of magnetoresistive sensor 302. The value of the bit being sensed by magnetoresistive sensor 302 (for example, either 1 or 0) may therefore be determined based on the current flowing from a first electrode (not shown) to a second electrode (not shown) connected to magnetoresistive sensor 302.

FIG. 4A is a schematic representation of a portion of a read head, according to various aspects of the present disclosure. Specifically, in FIG. 4A only a bottom part of a read head (e.g., read head 300 of FIG. 3) is illustrated. Read head 400 includes side shields 420, free layer 430, back edge 440 of free layer 430 and pinned layer shield (PLS) 425. In the example of FIG. 4A, free layer 430 is positioned between side shields 420 along the cross-track, or x-direction. Side shield 420 includes side shield head 410 and side shield tail 415. Side shield tail 415 extends in the y-direction beyond the back edge 440 of free layer 430.

In the example of a read head, the presence of a side shield tail (e.g., side shield tail 415) may lead to an unfavorable magnetic configuration. FIGS. 4B and 4C illustrate modeling of a read head, according to various aspects of the present disclosure. FIG. 4D illustrates a transfer curve of the resistance response of a free layer to applied magnetic field, according to various aspects of the present disclosure.

In FIGS. 4B and 4C, arrows 465 and 475 represent local magnetic field orientations within side shields 420. In FIG. 4B, arrows 465 are substantially parallel to one another. In FIG. 4C, arrows 475 are substantially antiparallel to one another. Rapid switching of magnetic field orientation from parallel to antiparallel in free layer 430 is seen at point A in the transfer curve illustrated in FIG. 4D. The rapid switching is caused by the formation of demagnetization fields (not shown) along the edges of side shield 420. The aspect ratio of side shield 420 contributes to the formation of demagnetization fields. The aspect ratio of side shield 420 is represented by the length of the side shield in the y-direction divided by the length of the side shield in the cross-track, or x-direction. Thus, as side shield tail 415 increases in length, so does aspect ratio of side shield 420. The demagnetization fields become stronger as the aspect ratio of side shield 420 increases. The demagnetization fields may reduce the threshold for rotation of local magnetic field orientations 465 and 475 and as a result, local magnetic field orientations 465 and 475 may switch rapidly rather than rotate smoothly. Rapid switching of magnetic field orientation in free layer 430 may introduce noise into read head 400 which may subsequently degrade read head 400 performance.

Figure 4E:
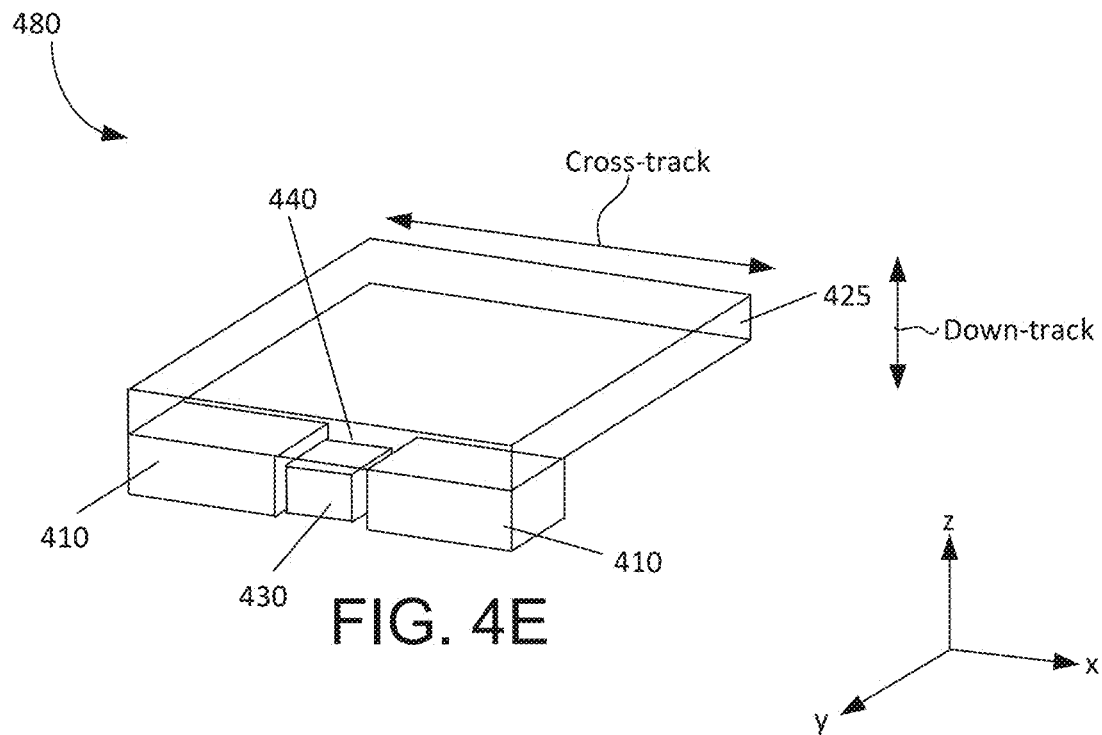
FIG. 4E is a schematic representation of a portion of a read head, according to various aspects of the present disclosure.

FIG. 4E is a schematic representation of a portion of a read head, according to various aspects of the present disclosure. Specifically, in FIG. 4E only a bottom part of a read head (e.g., read head 300 of FIG. 3) is illustrated. Read head 480 includes side shield head 410, free layer 430, back edge 440 of free layer 430 and pinned layer shield (PLS) 425. In the example of FIG. 4E, free layer 430 is positioned between side shield heads 410 along the cross-track, or x-direction. In contrast to read head 450 schematically represented in FIG. 4A, side shield tail 415 is absent from read head 480.

In the example of a read head, the absence of a side shield tail (e.g., side shield tail 415) may lead to a more favorable magnetic configuration than in a read head that includes a side shield tail. In other examples, it may be preferred that a side shield tail (e.g., side shield tail 415 of FIG. 4A) extend between about 0 nm and about 10 nm behind back edge 440 of free layer 430. The term "about" as used herein means approximately on nearly and in the context of a numerical value or range, means a variation of +/−20% or less. For example, a value differing by +/−19%, +/−15%, +/−10%, +/−5%, +/−1% would satisfy the definition of "about".

Figure 4F:
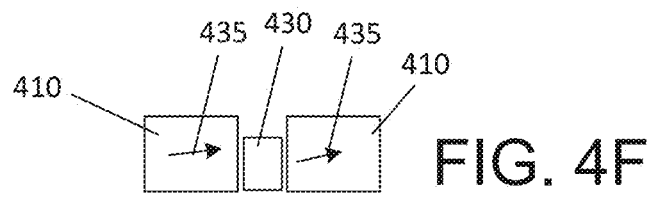
FIG. 4F illustrates modeling of a read head, according to various aspects of the present disclosure.
Figure 4G:
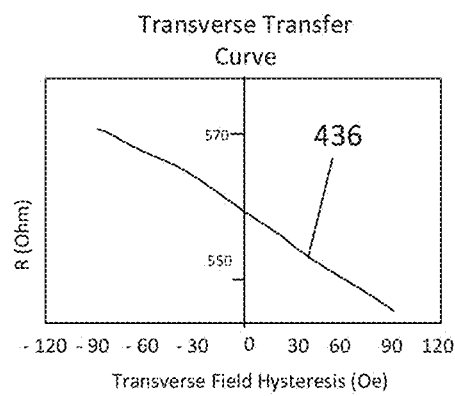
FIG. 4G illustrates a transfer curve of the resistance response of a free layer to applied magnetic field, according to various aspects of the present disclosure.

FIG. 4F illustrates modeling of a read head according to various aspects of the present disclosure. FIG. 4G illustrates a transfer curve of the resistance response of a free layer to applied magnetic field, according to various aspects of the present disclosure.

In FIG. 4F, arrows 435 represent local magnetic field orientations within side shield head. In the example of FIG. 4E and FIG. 4F, the absence of a side shield tail results in an aspect ratio of read head 480 being lower than an aspect ratio of read head 400. Thus, the demagnetization field is reduced in read head 480. The influence of the demagnetization field in a side shield with low aspect ratio is minimal which allows for smooth free layer rotation. Smooth rotation of local magnetic field orientation 435 with absence of rapid switching in free layer 430 is represented by smooth curve 436 illustrated in FIG. 4G. Smooth switching of magnetic field orientation 435 in free layer 430 may lead to reduced noise in read head 480 which may improve performance of read head 480.

FIGS. 5A and 5B illustrate microstructural device portions of a read head, according to various aspects of the present disclosure. In FIG. 5A, read head 500 includes side shield head 520, side shield tail 510, isolation regions 530 and 535, CMP stop layer 540, multilayer stack 546 and pinned layer shield 545. In the example of FIG. 5A, side shield tail 510 is disposed on top of isolation region 530. Line 547 follows the topography that is induced by the presence of side shield tail 510. Pinned layer shield 545 illustrates propagation of the topography represented by line 547 throughout read head 500. Such topography could be in the range of 10-100 nanometers and could affect the performance and functionality of read head 500 once integrated into a data storage device (e.g. data storage device 100 of FIG. 1). This could be especially true in examples where multiple devices are stacked on top of one another.

FIG. 5B illustrates a read head in which side shield tail 510 has been removed via a planarization process. In FIG.

5B, read head 550 includes side shield head 520, isolation regions 530 and 535, CMP stop layer 540, multilayer stack 546 and pinned layer shield 545. Line 548, which represents topography of read head 550 prior to deposition of pinned layer shield layers 545, is substantially flatter than line 547. Similarly, pinned layer shield 545 is substantially flatter in the example of read head 550 as compared to read head 500. In some examples, the removal of side shield tail 510 may be achieved via planarization techniques such as chemical mechanical polishing (CMP). In other examples, a combination of CMP and other physical removal steps may be used. Examples of other physical removal steps include etch processes (e.g., reactive ion etch, vacuum dry etc.) or mill processes (e.g., ion mill processes).

Figure 6:
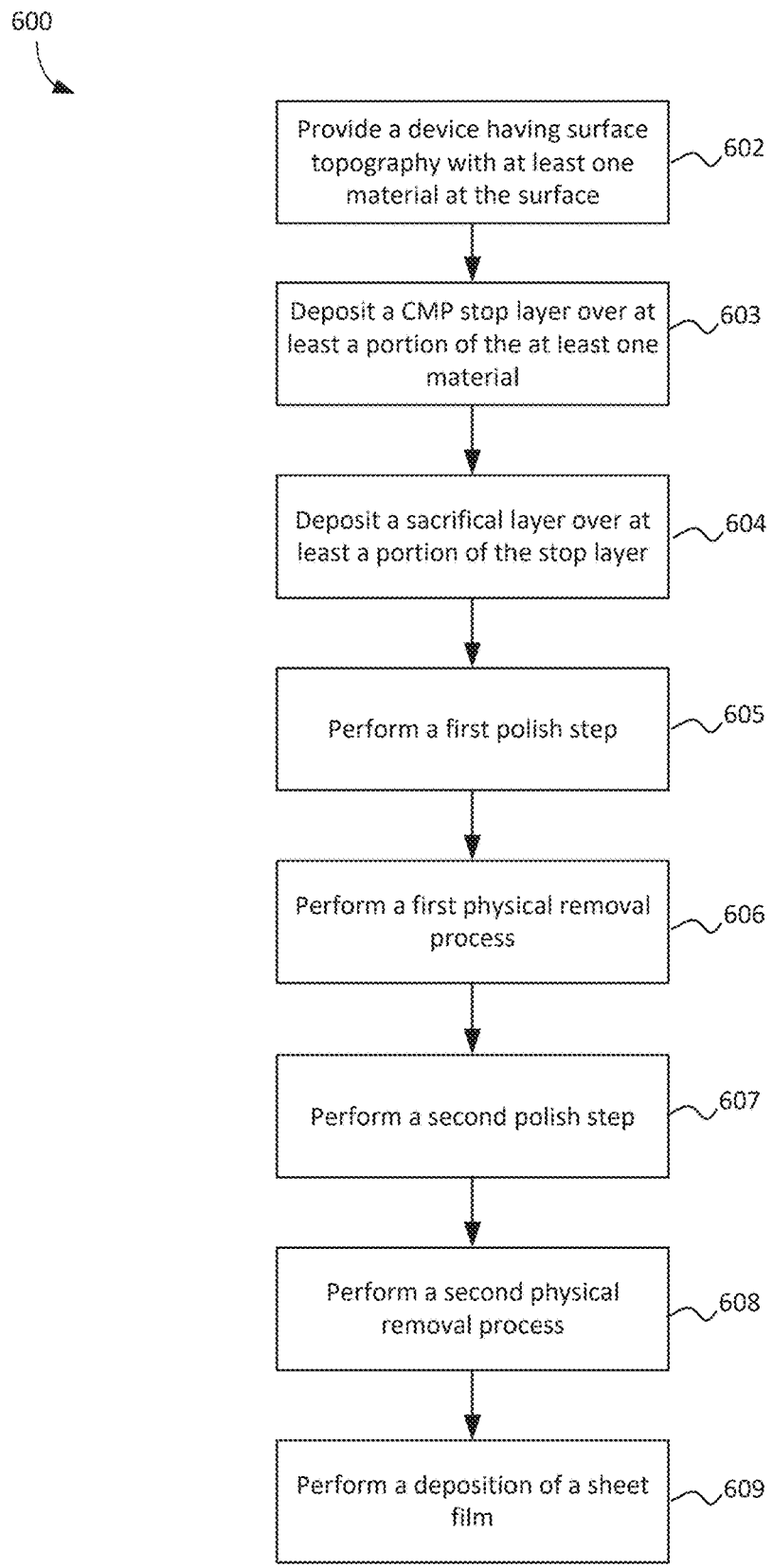
FIG. 6 is a process flow diagram illustrating an example method of a planarization process, according to various aspects of the present disclosure.

FIG. 6 is a flow diagram showing an example method of a planarization process, according to various aspects of the present disclosure. Flow chart 600 in FIG. 6 is described in reference to FIG. 8. A device 801 with topographical feature 850 and with at least one material at the surface is provided (at step 602). Device 801 includes side shield head 820, side shield tail 810 and isolation region 830. Top surface 811 of side shield tail 810 and top surface 821 of side shield head 820 are both at the surface of device 801.

A CMP stop layer 840 is deposited over at least a portion of the at least one material at the surface of device 801 (at step 603). CMP stop layer 840 may be deposited by various methods. CMP stop layer materials can include, for example, Pt, Ir, Ru, Rh, Mo, Ti, W, TiN and $SiO_2$, among others. In some examples, CMP stop layer 840 has a thickness ranging from about 1.0 nm to about 5.0 nm. CMP stop layer 840 has a slow CMP rate so that it is not removed quickly. CMP stop layer 840 may also be resistant to corrosion (e.g., CMP stop layer 840 may be a corrosion-inhibiting layer) from CMP slurries at the junction of side shield head 820, side shield tail 810 and isolation region 830.

Following deposition of stop layer 840, sacrificial layer 860 is deposited over at least a portion of CMP stop layer 840 (at step 604). Sacrificial layer 860 substantially retains topographical feature 850 of CMP stop layer 840. Sacrificial layer 860 may be deposited by any appropriate semiconductor processing technique. Sacrificial layer materials can include, for example NiFe, Ta, Cr, NiCr, Cu, SiN, $Al_2O_3$, $TiO_2$, CoFe, CoNiFe, NbO, SiC and SiON, among others. In one example, sacrificial layer 860 has a thickness of between about 10 nm to about 40 nm.

After the deposition of sacrificial layer 860, a first polish step is conducted to form device 804 (at step 605). The polish step can be a chemical mechanical polish (CMP), mechanical polish, or chemical polish. During the polish, a portion of sacrificial layer 860 is removed, leaving a remainder portion 863 of sacrificial layer 860. Sacrificial layer 860 is preferably a material that can be easily removed by CMP and that will be removed at a higher rate where there are topographical features such as topographical feature 850.

After the first polish step, device 804 is exposed to a first physical removal process to form device 805 (at step 606). The physical removal process removes a portion of CMP stop layer 840 over side shield tail in region A of device 804. A portion of remainder portion 863 of sacrificial layer 860 is also removed to leave a planarized surface.

After the first physical removal process, a second polish step is performed (at step 607) to form device 806. The second polish step may be a CMP step and removes the remainder portion 863 of sacrificial layer 860 as well as a portion of side shield tail 810.

After the second polish step, a second physical removal process is performed (in step 608) to form device 807. In the second physical removal process, the remainder portion of side shield tail 810 and the remainder portion of stop layer 840 in region B of device 806 are removed to form planarized device 807.

In some examples, following the second physical removal step, a sheet film deposition is conducted to form device 808 (at step 609).

Figure 7:
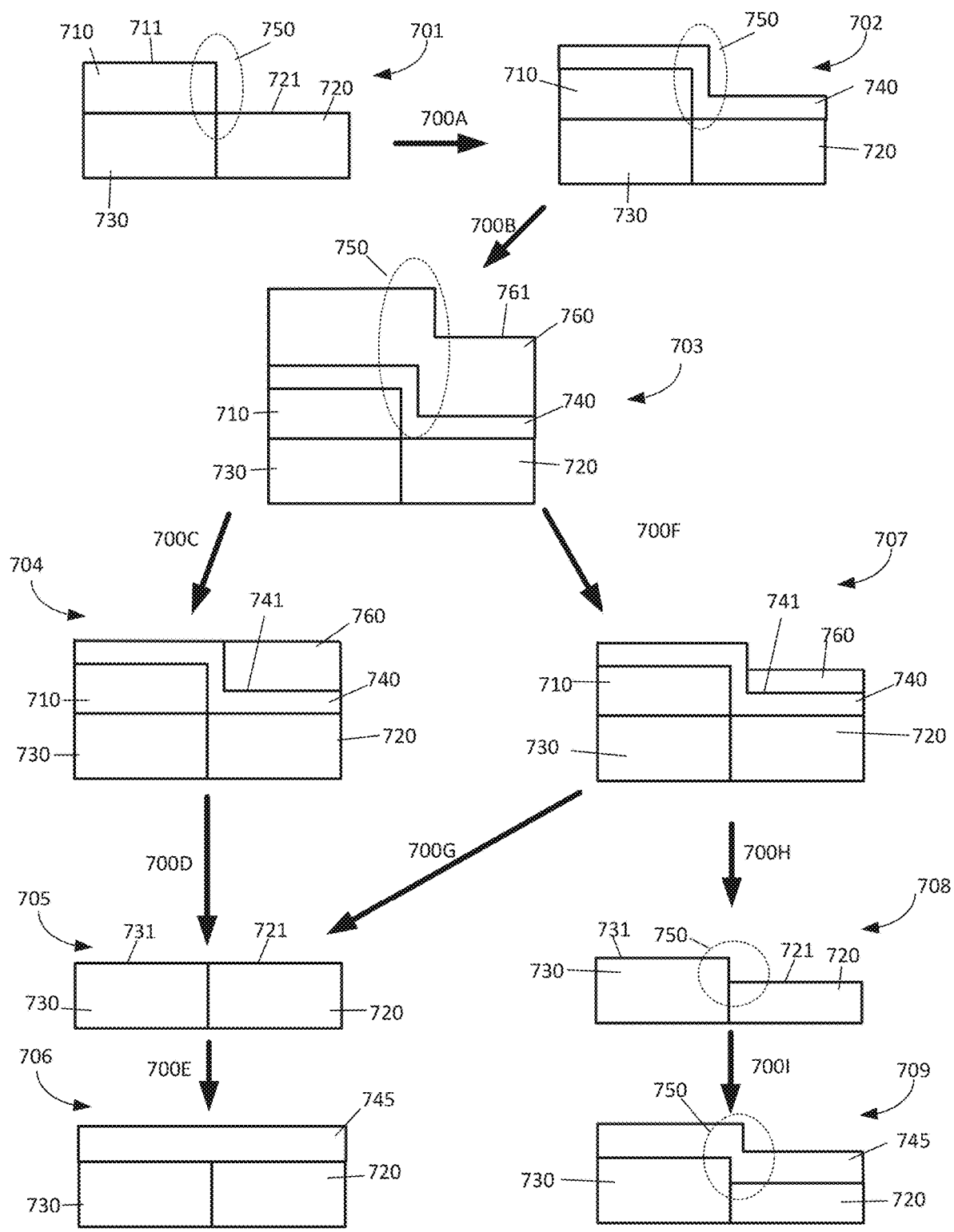
FIG. 7 is a process flow diagram illustrating an example method of a planarization process, according to various aspects of the present disclosure.

FIG. 7 shows a flow diagram illustrating an example set of steps of a planarization process, according to various aspects of the present disclosure. The method includes providing device 701, which includes side shield head 720, side shield tail 710 and isolation region 730. Device 701 exhibits surface topography at topographical feature 750. In the example of FIG. 7, at least one material is at the surface of device 701 with top surface 711 of side shield tail 710 and top surface 721 of side shield head 720 both at the surface of device 701.

In step 700A, CMP stop layer 740 is deposited on at least a portion of the top surface 711 of side shield tail 710 and top surface 721 of side shield head 720. Device 702 shows propagation of topographical feature 750 through CMP stop layer 740. CMP stop layer 740 may be deposited by various methods. Examples of illustrative deposition methods may include vapor deposition techniques such as chemical vapor deposition (CVD), physical vapor deposition (PVD), including magnetron sputtering, cathodic arc deposition, plasma enhanced chemical vapor deposition (PECVD), and laser ablation, among others. In some examples, deposition techniques that are conformal in nature may be used. Illustrative conformal techniques may include, for example, atomic layer deposition (ALD), chemical vapor deposition (CVD), ion beam sputter deposition (IBD) and others. CMP stop layer materials can include, for example, Pt, Ir, Ru, Rh, Mo, Ti, W. TiN and $SiO_2$, among others. CMP stop layer 740 thickness can range from about 1.0 nm to about 20 nm. In some examples, CMP stop layer 740 has a thickness ranging from about 1.0 nm to about 5.0 nm. CMP stop layer 740 has a slow CMP rate so that it is not removed quickly. CMP stop layer 740 may also be resistant to corrosion from CMP slurries at the junction of side shield head 720, side shield tail 710 and isolation region 730.

In step 700B, a sacrificial layer 760 is deposited over at least a portion of CMP stop layer 740 to form device 703. Sacrificial layer 760 substantially retains topographical feature 750 of underlying device 702. Sacrificial layer 760 may be deposited by any appropriate semiconductor processing technique. Example semiconductor deposition techniques include but are not limited to, vacuum deposition or sputtering (e.g., magnetron sputtering techniques, reactive magnetron sputtering techniques, plasma-enhanced chemical vapor deposition or ion-beam deposition). Sacrificial layer materials can include, for example, NiFe, Ta, Cr, NiCr, Cu. SiN, $Al_2O_3$, $TiO_2$. CoFe, CoNiFe, NbO, SiC and SiON, among others. In one example, sacrificial layer 760 has a thickness of about 10 nm to about 40 nm.

After the deposition of sacrificial layer 760, a planarization process is performed on device 703. In step 700C, a polish step is conducted. The polish step can be a chemical mechanical polish (CMP), mechanical polish, or chemical polish. In step 700C a CMP process on top surface 761 of sacrificial layer 760 is used. In step 700C, a portion of sacrificial layer 760 is removed. Sacrificial layer 760 is preferably a material that can be easily removed by CMP and that will be removed at a higher rate where there are topographical features such as topographical feature 750. In contrast to sacrificial layer 760, CMP stop layer 740 has a slow CMP rate so it is not removed quickly. In the example of step 700C, the CMP process ends on CMP stop layer 740, leaving a remainder portion of sacrificial layer 760 on top surface 741 of CMP stop layer 740. Endpoint control methods used in step 700C include motor current, eddy current or optical endpoints, among others. In some examples, the CMP process is time-controlled.

In step 700D, a physical removal process is conducted. Physical removal process 700D removes the remainder portion of sacrificial layer 760 as well as CMP stop layer 740 and side shield tail 710, leaving a substantially planar surface on device 705. Preferred physical removal processes will remove the material on an atomic or a micro level. In step 700D, the physical removal process is a milling operation but could be any suitable physical removal process known in the art (e.g., milling operation, etching operation). In the example of step 700D, the mill rates of sacrificial layer 760 and side shield tail 710 are similar. Physical removal process 700D may be a timed mill or may be an endpoint-controlled mill.

Following physical removal process 700D, a sheet film layer 745 may be deposited on top surface 721 of side shield head 720 and top surface 731 of isolation region 730 during deposition step 700E. In some examples, sheet film layer 745 is a single layer. In other examples, sheet film layer 745 is a multilayer.

In some examples, the physical removal rate of sacrificial layer 760 and the physical removal rate of side shield tail 710 may be different. In a case where the physical removal rate of sacrificial layer 760 is lower than the physical removal rate of side shield tail 710, an intended over-polish at the polish step may be used to remove a portion of sacrificial layer 760 prior to a physical removal process. In the example of FIG. 7 and in alternate step 700F, a CMP process with an intended over-polish is conducted. This results in a non-planar topography as illustrated in device 707.

In step 700G, a physical removal process is conducted to form device 705. Physical removal process 700G removes the remainder portion of sacrificial layer 760 as well as CMP stop layer 740 and side shield tail 710, leaving a substantially planar surface. In step 700G, the physical removal process is a milling operation but could be any suitable physical removal process known in the art (e.g., milling operation, etching operation). In the example of step 700G, the mill rate of sacrificial layer 760 is lower than the mill rate of side shield tail 710. Physical removal process 700G may be a timed mill or may be an endpoint-controlled mill.

In other alternate examples, it may be preferred to maintain topographical feature 750 throughout the planarization process. In this case, the material of sacrificial layer 760 may be chosen to have a similar physical removal rate as side shield tail 710. In step 700F, a CMP process with an intended over-polish is conducted. This removes a portion of sacrificial layer 760 prior to a physical removal process.

In step 700H, an alternate physical removal process is conducted to form device 708. Physical removal process 700H removes the remainder portion of sacrificial layer 760, CMP stop layer 740, side shield tail 710 and a portion of side shield head 720 to form device 708. In step 700H, the physical removal process is a milling operation but could be any suitable physical removal process known in the art (e.g., milling operation, etching operation). In the example of step 700H, the mill rate of sacrificial layer 760 is approximately the same as the mill rate of side shield tail 710, thus topographical feature 750 remains after physical removal process 700H. Physical removal process 700H may be a timed mill or may be an endpoint-controlled mill.

Following physical removal process 700H, a sheet film layer 745 may be deposited on top surface 721 of side shield head 720 and top surface 731 of isolation region 730 during deposition step 700I to form device 709. Sheet film layer 745 can be a single layer or a multilayer. Device 709 shows propagation of topographical feature 750 through sheet film layer 745.

Figure 8:
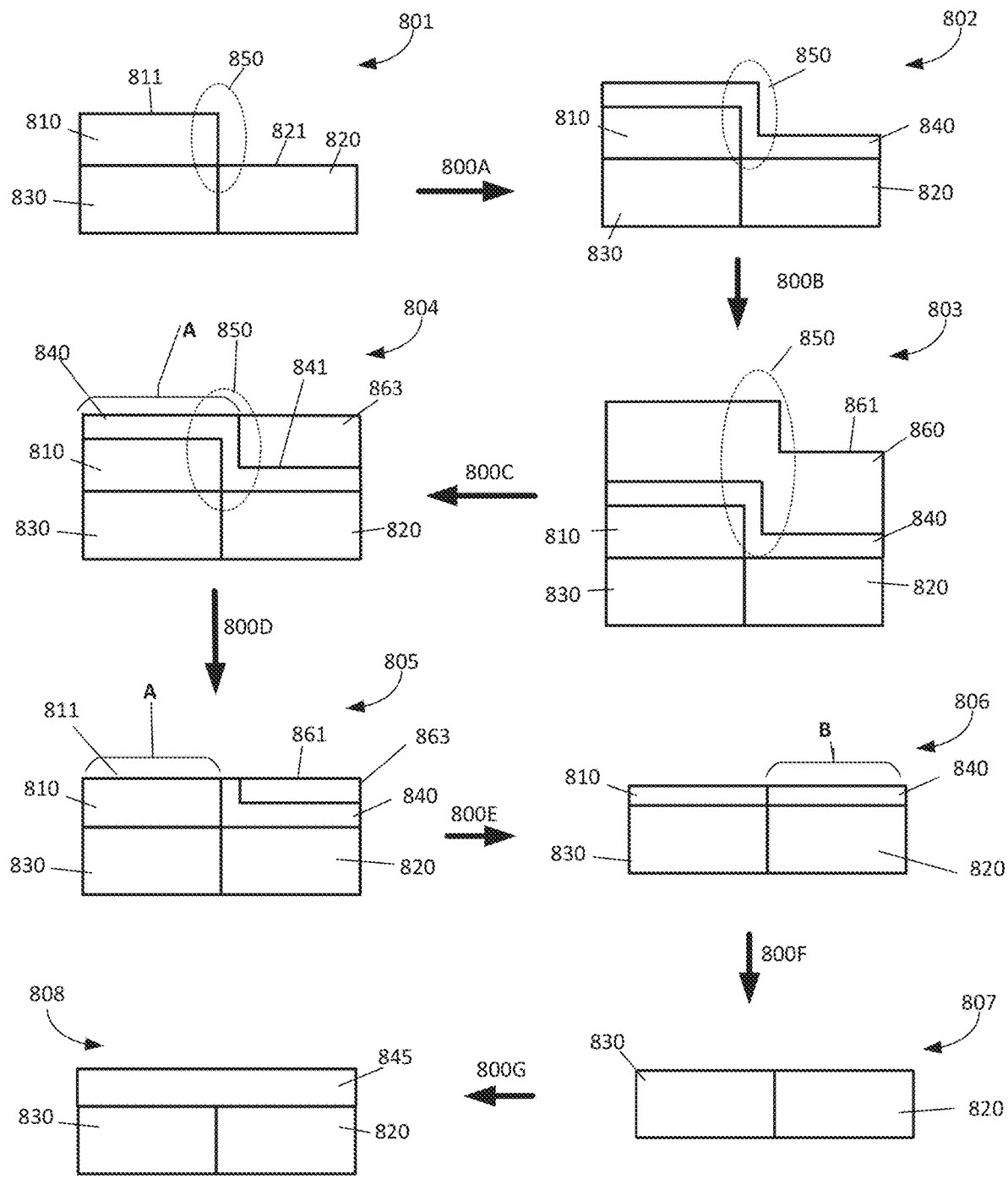
FIG. 8 is a flow diagram illustrating an example method of a planarization process, according to various aspects of the present disclosure.

In examples where the physical removal rate of the sacrificial layer and the physical removal rate of the side shield tail are very different, other methods of planarization may be used. FIG. 8 is a flow diagram showing an example set of steps of a planarization process, according to various aspects of the present disclosure. The method includes providing device 801, which includes side shield head 820, side shield tail 810 and isolation region 830. Device 801 exhibits surface topography at topographical feature 850. In the example of FIG. 8, at least one material is at the surface of device 801 with top surface 811 of side shield tail 810 and top surface 821 of side shield head 820 both at the surface of device 801.

In step 800A, CMP stop layer 840 is deposited over at least a portion of top surface 811 of side shield tail 810 and top surface 821 of side shield head 820. Device 802 shows propagation of topographical feature 850 through CMP stop layer 840. CMP stop layer 840 may be deposited by various methods. Examples of illustrative deposition methods may include vapor deposition techniques such as chemical vapor deposition (CVD), physical vapor deposition (PVD), including magnetron sputtering, cathodic arc deposition, plasma enhanced chemical vapor deposition (PECVD), and laser ablation. In some examples, deposition techniques that are conformal in nature may be used. Illustrative conformal techniques may include, for example, atomic layer deposition (ALD), chemical vapor deposition (CVD), ion beam sputter deposition (IBD) and others. CMP stop layer materials can include, for example, Pt, Ir, Ru, Rh, Mo, Ti, W. TiN and $SiO_2$, among others. CMP stop layer 640 thickness can range from about 1.0 nm to about 20 nm. In some examples, CMP stop layer 640 has a thickness ranging from about 1.0 nm to about 5.0 nm. CMP stop layer 840 has a slow CMP rate so that it is not removed quickly. CMP stop layer 840 may also be resistant to corrosion from CMP slurries at the junction of side shield head 820, side shield tail 810 and isolation region 830 (e.g., at topographical feature 850).

In step 800B, a sacrificial layer 860 is deposited over at least a portion of CMP stop layer 840. Sacrificial layer 860 substantially retains topographical feature 850 of CMP stop layer 840. Sacrificial layer 860 may be deposited by any appropriate semiconductor processing technique. Example semiconductor deposition techniques include but are not limited to, vacuum deposition or sputtering (e.g., magnetron sputtering techniques, reactive magnetron sputtering techniques, plasma-enhanced chemical vapor deposition or ion-beam deposition). Sacrificial layer materials can include, for example, NiFe, Ta, Cr, NiCr, Cu, SiN, $Al_2O_3$, $TiO_2$, CoFe, CoNiFe, NbO, SiC and SiON, among others. In one example, sacrificial layer 860 has a thickness of about 10 nm to about 40 nm.

After the deposition of sacrificial layer 860, a planarization process is conducted. In step 800C, a polish step is performed to form device 804. The polish step can be a chemical mechanical polish (CMP), mechanical polish, or chemical polish. In step 800C, the polish step on top surface 861 of sacrificial layer 860 is conducted by CMP. In the example of step 800C, a portion of sacrificial layer 860 is removed, leaving a remainder portion 863 of sacrificial layer 860. Sacrificial layer 860 is preferably a material that can be easily removed by CMP and that will be removed at a higher rate where there are topographical features such as topographical feature 850. In contrast, CMP stop layer 840 has a slow CMP rate so it is not removed quickly. In the example of step 800C, the CMP process ends on CMP stop layer 840, leaving a remainder portion 863 of sacrificial layer 860 on top surface 841 of CMP stop layer 840. Endpoint control methods used in step 800C include motor current, eddy current or optical endpoints, among others.

In step 800D a physical removal process is conducted on device 804 to form a planarized surface in device 805. Physical removal process 800D removes a portion of CMP stop layer 840 over side shield tail 810 in region A of device 804. Following the removal of CMP stop layer 840, a top surface 811 of side shield tail 810 is exposed. Step 800D also removes a portion of remainder portion 863 of sacrificial layer 860 leaving a planarized surface. In step 800D, the physical removal process is a milling operation but could be any suitable physical removal process known in the art (e.g., milling operation, etching operation). Milling process 800D is a short mill and may be a timed mill or may be an endpoint-controlled mill. Milling process 800D ends once CMP stop layer 840 in region A is removed.

In step 800E, a second polish step is conducted on the planarized surface of device 805 to form device 806. Planarized surface of device 805 includes top surface 861 of sacrificial layer 860 and top surface 811 of side shield tail 810. The polish step can be a chemical mechanical polish (CMP), mechanical polish, or chemical polish. In step 800E, the polish step of top surface 861 of sacrificial layer 860 and top surface 811 of side shield tail 810 is conducted by CMP. CMP step 800E removes the remainder portion 863 of sacrificial layer 860 as well as a portion of side shield tail 810. CMP step 800E stops on the remainder portion of CMP stop layer 840 illustrated in region B in device 806.

In step 800F, device 806 is exposed to a physical removal process to form device 807. In step 800F, the remainder portion of side shield tail 810 and the remainder portion of CMP stop layer 840 in region B of device 806 are removed. Milling process 800F is a short mill and may be a timed mill or may be an endpoint-controlled mill. Milling process 800F ends once CMP stop layer 840 in region B and remainder portion of side shield tail 810 are removed. In step 800F, the physical removal process is a milling operation but could be any suitable physical removal process known in the art (e.g., milling operation, etching operation). In the example of FIG. 8, physical removal process 800F results in formation of planarized device 807.

Following physical removal process 800F, a sheet film layer 845 may be deposited on top surface 821 of side shield head 820 and top surface 831 of isolation region 830 during deposition step 800G. Sheet film layer 845 can be a single layer or a multilayer.

Various examples have been presented for the purpose of illustration and description. These and other examples are within the scope of the following claims.

What is claimed is:

1. A method of planarizing a device having a surface topography with at least one material at a surface of the device, the method comprising the steps of:
   depositing a stop layer over at least a portion of the at least one material, wherein the stop layer substantially retains the surface topography of the device;
   depositing a sacrificial layer over at least a portion of the stop layer, wherein the sacrificial layer substantially retains the surface topography of the device;
   performing a planarization process on the device, wherein the planarization process comprises the steps of:
   performing a first chemical mechanical polish on a top surface of the sacrificial layer, leaving a remainder portion of the sacrificial layer;
   performing a first physical removal step on the remainder portion of the sacrificial layer to physically remove at least a portion of the stop layer, and also to expose a top surface of the at least one material to form a planarized surface;
   performing a second chemical mechanical polish on the planarized surface to remove the remainder portion of the sacrificial layer, and a portion of the at least one material; and
   performing a second physical removal step on a remainder portion of the stop layer and a remainder portion of the at least one material, to form a planarized device.

2. The method of claim 1, wherein the method of planarizing removes a side shield tail from the device.

3. The method of claim 1, wherein the method of planarizing leaves between about 0 nm and about 10 nm of a side shield tail.

4. The method of claim 1, wherein the at least one material is NiFe.

5. The method of claim 1, wherein performing the first chemical mechanical polish includes stopping the first chemical mechanical polish on the stop layer.

6. The method of claim 1, wherein performing the second chemical mechanical polish includes stopping on the stop layer.

7. The method of claim 1, wherein a physical removal rate of the sacrificial layer is different to a physical removal rate of the at least one material.

8. The method of claim 1, further comprising a step of depositing a sheet film layer onto a surface of the device after completion of the second physical removal step.

9. The method of claim 1, wherein performing the first physical removal step includes a mill step.

10. The method of claim 1, wherein performing the second physical removal step includes a mill step.

11. The method of claim 1, wherein the stop layer is a corrosion inhibiting layer.

12. A method of planarizing a device having a surface topography with at least one material at a surface of the device, the method comprising the steps of:
   depositing a stop layer over at least a portion of the at least one material, wherein the stop layer substantially retains the surface topography of the device wherein the device includes a side shield tail;
   depositing a sacrificial layer over at least a portion of the stop layer, wherein the sacrificial layer substantially retains the surface topography of the device; and
   performing a planarization process on the device, wherein the planarization process includes at least one polish step and at least one physical removal step which reduces the side shield tail.

13. The method of claim 12, wherein performing the planarization process comprises planarizing the side shield tail until the side shield tail is removed.

14. The method of claim 12, wherein performing the planarization process comprises planarizing the side shield tail until between about 0 nm and about 10 nm of the side shield tail remains.

15. The method of claim 12, wherein the at least one material is NiFe.

16. The method of claim 12, wherein the at least one material is an insulator.

17. The method of claim 12, wherein performing the planarization process includes at least one of mechanically polishing, chemically polishing or chemically mechanically polishing a top surface of the sacrificial layer.

18. The method of claim 12, wherein the stop layer is a corrosion inhibiting layer.

19. The method of claim 12, further comprising a step of depositing a sheet film layer onto a surface of the device after completion of the physical removal of a remainder portion of the sacrificial layer.

20. The method of claim 12, wherein performing the physical removal step includes a mill step.

* * * * *